Feb. 21, 1956   C. J. BISHOFBERGER   2,735,644
VALVE
Filed Nov. 20, 1950

INVENTOR.
CARL J. BISHOFBERGER
BY
George H. Fisher
ATTORNEY.

2,735,644

VALVE

Carl J. Bishofberger, Minneapolis, Minn., assignor to Minneapolis-Honeywell Regulator Company, Minneapolis, Minn., a corporation of Delaware Application November 20, 1950, Serial No. 196,555

7 Claims. (Cl. 251—77)

This invention relates to solenoid valves and, more specifically, it relates to improvements in the delayed action solenoid valve disclosed in a co-pending patent application of William J. McGoldrick, Serial No. 193,713, filed November 2, 1950.

In delayed action solenoid valves, wherein a resistor having a negative temperature coefficient of resistance is in series with the valve coil, the energization of the coil builds up slowly. In this slow build up of the energization a point is reached wherein there is a tendency for the solenoid plunger to chatter, or vibrate, or lift slightly without fully pulling into the plunger tube. This causes a slight leakage of fluid past the valve, in the prior art arrangements, wherein a valve and the plunger are substantially rigidly connected together.

It is one of the objects of this invention to provide a plunger-valve combination in a solenoid valve that overcomes the above mentioned difficulties.

It is another object of the invention to provide a solenoid valve which may be mounted in any position.

It is a further object of the invention to provide a solenoid plunger-valve combination wherein there is substantial relative movement between the plunger and the valve.

Still another object of the invention is to provide in a delayed action solenoid valve, a plunger-valve arrangement wherein the plunger is resiliently biased against the valve, which, in turn, is biased against its cooperating valve seat.

Another object of the invention is to provide a solenoid valve having means for biasing the plunger by means of a spring positioned within said plunger, without materially affecting the magnetic flux flow.

Still other objects of the invention will become apparent upon reading the following detailed description of the invention in conjunction with the accompanying drawing, wherein.

Figure 1:
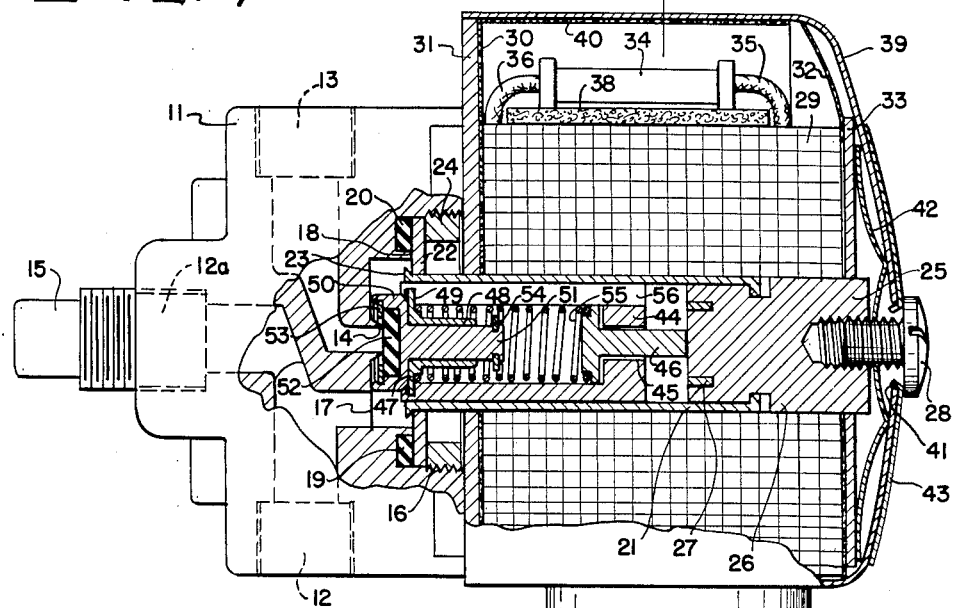
Figure 1 is an elevational view of the solenoid valve with portions thereof broken away.
Figure 2:
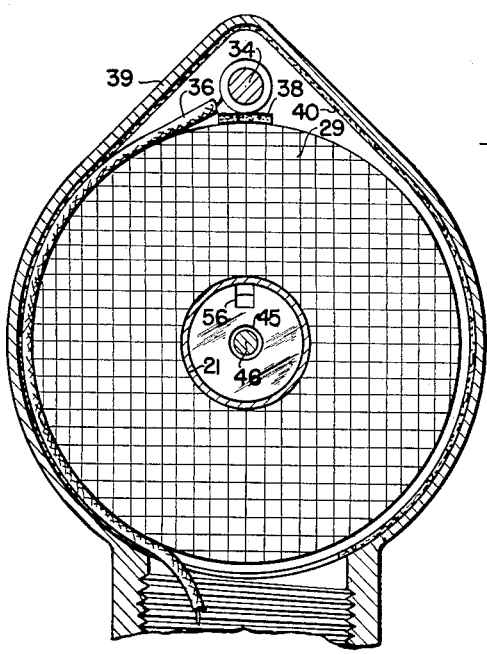
Figure 2 is a cross-sectional view of the valve taken along line 2—2 of Figure 1.

Referring to Figure 1 of the drawing, the solenoid valve comprises a valve body 11 having an inlet 12 and an outlet 13 and a valve seat 14 therebetween. A plug 15 seals an alternate inlet 12a, which may be used instead of the inlet 12, if it is more convenient to do so. The valve body 11 has a stepped bore through a side wall thereof, coaxial with the valve seat 14. Said stepped bore consists of an internally threaded bore 16 and an unthreaded, smaller diameter bore 17 extending inwardly from the bottom of bore 16 to the valve seat 14, which forms a shoulder 18 between said bores 16 and 17. An annular groove 19 in the shoulder 18 has a sealing ring 20 therein for sealingly engaging a solenoid plunger tube assembly.

A non-magnetic tube 21 has one of its ends extending through a washer 22, which is retained on said end by staking over said end, as shown at 23, and/or by brazing said washer to said end. As can be seen in the drawing, said washer 22 is clamped against the sealing washer 20 by means of a ring nut 24. The other end of the tube 21 is closed by a plug 25 of magnetic material. The plug is held in said tube by inwardly staking said other end of the tube into an annular groove 26 in said plug and/or by welding or brazing said tube to said plug. The inner end of the plug 25 has an annular groove therein which holds a copper shading ring 27, while the other end of the plug has a threaded bore therein to receive a bolt 28.

A solenoid coil 29 slidably fits over and around the tube 21 and bears at its inner end against an insulation washer 30 and a washer 31 of magnetic material, which, in turn, bears against the valve body. Positioned against the other end of the coil 29 is a second insulation washer 32 and a second magnetic washer 33. A thermistor or resistor 34, having a negative temperature coefficient of resistance, is connected by a lead 35 to one end of the coil 29 while the other end thereof is connected to a long lead 36, which extends outwardly from the valve unit for connection to an external circuit. The other end of the coil 29 (not shown) is connected to a long lead 37, which also extends from the valve unit for connection to an external circuit. The thermistor is insulated from the coil 29 by means of an insulation pad 38 of any suitable material. A generally cup-shaped housing 39 surrounds the coil 29, thermistor 34 and washers 30, 31, 32, and 33. This housing is made of magnetic material, such as steel, and the side wall thereof is lined with a strip of insulation material 40. The closed end of the housing 39 has an aperture 41 therein coaxial with the threaded bore in the end of the plug 25. A spring washer 42 bears against the inner surface of the housing 39 and against the washer 33 for resiliently, but firmly, holding the washers 32 and 33 against the coil 29 and the coil 29 against the washers 30 and 31, in assembled relationship, the housing 39 being held in position by means of a bolt 28 extending through an apertured name plate 43, opening 41 in housing 39, through spring washer 42, and into screw threaded engagement with the threaded bore in the plug 25. The head of the bolt 28 holds said name plate and housing in position longitudinally of the plunger tube.

Positioned within the tube 21 is a generally cup-shaped plunger 44 of magnetic material which has a small coaxial bore 45 through the closed end thereof through which extends the stem of a headed pin 46 into engagement with the inner end of the plug 25. The other end of the plunger extends inwardly over the peripheral edge of a flange 47 on a collar 48 to hold said flange against a shoulder 49 in said other end of the plunger. A valve having a head 50 and a stem 51, which extends through the sleeve 48, is adapted to cooperate with the valve seat 14 to control the flow of fluid therethrough. The head 50 has a sealing disk 52, positioned in a centrally disposed recess in said head, to provide the seal. Said disk 52 is retained in said recess in the head by means of a washer 53 overlying the peripheral edge of the disk, while the washer 53, itself, is retained in position by staking the peripheral edge of the head 50 inwardly over the outer peripheral edge of the washer 53. The stem 51 extends beyond the collar or sleeve 48 and carries an abutment washer 54 positioned in an annular groove near the end of the stem. It is thus seen that due to the spacing between abutment washer 54 and the adjacent end of the sleeve 48, which provides a lost-motion connection between said valve and plunger, the plunger 44 may move slightly away from the head 50 without causing any movement of the valve sealing disk 52. The disk 52 is held against the valve seat and the outer end of the headed pin 46 is held against the plug 25 by means of a coil compression spring 55 positioned within the plunger and bearing at opposite ends thereof against the head of the pin 46 and the flange 49. It is thus seen that the plunger 44 will be held against the head 50 of the valve and the disk 52 in engagement with the seat 14 by the same amount of force that the pin 46 bears against the plug 25, provided the longitudinal axis of the plunger is substantially horizontal. When the solenoid tube is vertically above the valve seat, the seating force of the washer on the valve seat would be equal to the force of the spring plus the weight of the plunger, valve and pin. In order to prevent any dashpot action of the plunger in the tube, a longitudinal slot 56 is provided in the side of the plunger. The slot 56 also helps prevent the developing of any undesired induced currents in the plunger. The headed pin 46 enables the use of a large coil spring without cutting down materially in the mass of metal in the adjacent plunger end.

Operation

Figure 3:
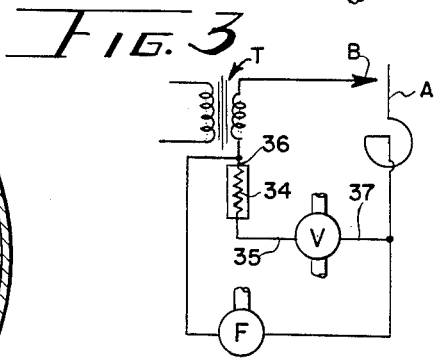
Figure 3 is a wiring diagram of a simple control system in which the valve may be used.

With the valve installed in an oil burner heating system of the type wherein a fan provides combustion air to the furnace, such a fan being designated by the letter F in Figure 3 of the drawing, it will be noted that upon the movement of a movable contact arm A into engagement with the fixed contact B of a room thermostat, parallel energizing circuits will be completed to both the fan F and to the thermistor 34 and valve coil 29, from the secondary of the transformer T. This will cause immediate full energization of the fan but only partial energization of the valve coil and the resistor 34. The current that does flow through the valve coil is insufficient to cause the plunger to pull in against the bias of the spring to open the valve. However, after a predetermined length of time, depending upon the characteristics of the resistor 34, as said resistor 34 begins to heat up, the resistance thereof gradually decreases, permitting more and more current to flow through the valve until a degree of energization is reached that causes the valve to be pulled open. Sometime prior to the coil becoming sufficiently energized to pull the valve off of the seat, the pull on the plunger will be sufficiently great to cause it to intermittently move slightly inwardly of the plunger tube but, due to the lost motion provided between the abutment washer 54 on the valve stem and the end of the sleeve 48, there will be no raising of the sealing disk 52 off of the valve seat 14, the oil pressure on valve head 50 being sufficient to keep it closed. As the energization of the coil builds up, the plunger will move further into the plunger tube, causing the end of the sleeve 48 to engage the shoulder 54 so that, any further inward movement of the plunger, would have to cause lifting of the valve off of this seat. However, by this time, the coil has become sufficiently energized that the plunger will be pulled in rapidly by the coil, causing quick opening of the valve disk 52 from the seat 14. By providing this means of preventing any opening of the valve until it can open quickly, for delivering full oil flow, no dribbling of oil occurs at the burner nozzle of the heating apparatus, a result which is highly desirable in oil burner installations.

While the valve is delayed in its opening, upon the closing of the room thermostat, or by any other combustion control (not shown) that may be used in conventional burner installations, it is obvious that the operation of the room thermostat or other control, will break the circuit to the valve and the fan which will cause immediate de-energization and closing of the valve as well as deenergization of the fan. The bias of the spring 55 will cause quick closing of the valve, to prevent dribbling at the burner nozzle, while the fan will coast to a stop.

While I have described the preferred embodiment of the invention, it will be obvious to those skilled in the art that modifications may be made therein without departing from the spirit of the invention. Therefore, it is to be expressly understood that the scope of the invention is to be determined solely from the appended claims.

I claim:

1. A solenoid valve comprising an open-side valve body having an inlet and an outlet with a valve seat therebetween, a valve cooperable with said seat and having a stem thereon, a cup-shaped tube positioned on said valve body for sealing said open side, a hollow plunger in said tube, one end of said plunger normally abutting against said valve and having an opening therein through which said stem slidably extends, a head on said stem of larger diameter than said opening and normally spaced from said one end, the other end of said plunger having a hole therein and normally spaced from the closed end of said tube, a thrust pin slidably extending from the closed end of said tube through said hole and having a head thereon within said plunger of larger diameter than said hole, a spring between said one end and said thrust pin head for holding said valve closed, an electrically energizable coil surrounding said tube, and a resistor having a negative coefficient of resistance connected in series with said coil.

2. A solenoid valve comprising an open-side valve body having an inlet and an outlet with a valve seat therebetween, a valve cooperable with said seat and having a stem thereon extending through said open side, a tube having a closed end and an open end positioned on said valve body to seal said open side, a hollow plunger in said tube, one end of said plunger normally abutting against said valve and having an opening therein through which said stem slidably extends, a head on said stem of larger diameter than said opening and normally spaced from said one end, the other end of said plunger having a hole therein and normally spaced from the closed end of said tube, a thrust pin slidably extending from said closed end through said hole and having a head thereon of larger diameter than said hole, biasing means between said one end and said thrust pinhead normally holding said valve against said seat, an electrically energizable coil on said tube, and a resistor having a negative coefficient of resistance connected in series with said coil.

3. A solenoid valve comprising an open-side valve body having an inlet and an outlet with a valve seat therebetween, a valve cooperable with said seat and having a stem thereon extending through said open side, a tube having a closed end and an open end positioned on said valve body to seal said open side, a hollow plunger in said tube, one end of said plunger having an opening therein through which said stem slidably extends, a head on said stem of larger diameter than said opening and normally spaced from said one end, the other end of said plunger being normally spaced from the closed end of said tube, means resiliently biasing said plunger against said valve and said valve against said seat, an electrically energized coil surrounding said tube, and a resistor having a negative coefficient of resistance connected in series therewith.

4. In a solenoid valve having a valve seat, a coil and thermally variable coefficient of resistance resistor means in circuit with said coil for gradually increasing the energization of said coil, the combination comprising a solenoid plunger tube closed at one of its ends and open at its other end, a hollow plunger slidable in said tube, said plunger having an aperture in each of its ends, a headed thrust pin extending through one of said apertures, a valve having a stem thereon slidably extending through the aperture in the other plunger end and normally being in engagement with said valve seat, an abutment on said stem normally spaced from said other plunger end but engageable therewith to move said valve when said plunger moves toward said closed end of said tube, and means between said other plunger end and the head on said pin for resiliently biasing said pin against the closed end of said tube and said plunger against said valve and said valve against said valve seat.

5. In a solenoid valve having a valve seat, a coil and thermally variable coefficient of resistance resistor means in circuit with said coil for gradually increasing the energization of said coil, the combination comprising a solenoid plunger tube closed at one of its ends and open at its other end, a hollow plunger slidable in said tube, said plunger having an aperture in each of its ends, a thrust pin extending through one of said apertures and into engagement with the closed end of said tube, a valve having a stem thereon slidably extending through the aperture in said other plunger end and into engagement with said valve seat, an abutment on said stem normally spaced from said other plunger end but engageable therewith to move said valve when said plunger moves toward the closed end of said tube, and means between said other plunger end and said thrust pin for biasing and holding said pin against the closed end of said tube and said valve against said valve seat when said coil is deenergized.

6. An electric valve for the valving of a fluid comprising a valve body having an inlet and an outlet with a valve seat therebetween, a valve head cooperable with said valve seat, electric power means having a movable part for actuating said valve, spring means for normally holding said movable part against said valve head and said head against said valve seat, thermally variable coefficient of resistance resistor means in circuit with said power means for gradually increasing the energization thereof, and a lost motion connection between said movable part and said valve head for permitting limited movement of said movable part without partially opening said valve head.

7. An electric valve for the valving of a fluid comprising a valve body having an inlet and an outlet with a valve seat therebetween, a valve head cooperable with said valve seat, electric power means having a movable part for actuating said valve, spring biasing means for normally biasing said valve head and said movable part toward said valve seat, lost motion means connecting said valve head and said movable part for permitting limited movement of said movable part without operation of said valve head, and automatic electrical means connected to said power means for gradually increasing the energization of said power means during initial energization of said power means.

References Cited in the file of this patent

UNITED STATES PATENTS

| | | |
|---|---|---|
| 1,516,646 | Roseby | Nov. 25, 1924 |
| 2,003,624 | Bower | June 6, 1935 |
| 2,034,311 | Rubel | Mar. 17, 1936 |
| 2,050,430 | Erickson | Aug. 11, 1936 |
| 2,114,961 | Gille | Apr. 19, 1938 |
| 2,123,063 | Peters | July 5, 1938 |
| 2,188,565 | Bower | Jan. 30, 1940 |
| 2,222,419 | McCarty | Nov. 19, 1940 |
| 2,269,865 | Shaw | Jan. 13, 1942 |
| 2,282,197 | Maynard | May 5, 1942 |
| 2,297,626 | Lennholm | Sept. 29, 1942 |
| 2,458,123 | Wasserlein | Jan. 4, 1949 |
| 2,508,588 | Waltman | May 23, 1950 |
| 2,528,898 | McIlvaine | Nov. 7, 1950 |
| 2,536,813 | Jones | Jan. 2, 1951 |